(12) United States Patent
Laitila et al.

(10) Patent No.: US 10,484,903 B2
(45) Date of Patent: Nov. 19, 2019

(54) BEARER SERVICE IN COMMUNICATIONS

(75) Inventors: Matti Einari Laitila, Oulu (FI); Seppo Ilmari Vesterinen, Oulunsalo (FI)

(73) Assignee: Nokia Solutions and Networks Oy, Espoo (FI)

( * ) Notice: Subject to any disclaimer, the term of this patent is extended or adjusted under 35 U.S.C. 154(b) by 384 days.

(21) Appl. No.: 14/355,044

(22) PCT Filed: Oct. 21, 2011

(86) PCT No.: PCT/EP2011/068437
§ 371 (c)(1),
(2), (4) Date: Apr. 29, 2014

(87) PCT Pub. No.: WO2013/056746
PCT Pub. Date: Apr. 25, 2013

(65) Prior Publication Data
US 2014/0307617 A1    Oct. 16, 2014

(51) Int. Cl.
*H04H 20/71* (2008.01)
*H04W 28/02* (2009.01)
*H04L 12/18* (2006.01)

(52) U.S. Cl.
CPC .......... *H04W 28/02* (2013.01); *H04L 12/189* (2013.01); *H04L 12/1836* (2013.01)

(58) Field of Classification Search
CPC ..... H04W 72/005; H04W 4/06; H04W 88/08; H04L 12/189; H04L 12/18
USPC ......................................... 370/312; 455/552
See application file for complete search history.

(56) References Cited

U.S. PATENT DOCUMENTS

| | | | |
|---|---|---|---|
| 2004/0158872 A1* | 8/2004 | Kobayashi | H04L 12/1886 725/120 |
| 2005/0101351 A1* | 5/2005 | Lee | H04W 68/00 455/558 |
| 2008/0039057 A1* | 2/2008 | Worrall | H04W 72/005 455/414.1 |
| 2009/0052450 A1* | 2/2009 | Mockett | H04L 1/0009 370/390 |

(Continued)

OTHER PUBLICATIONS

3GPP TSG SA WG2 Meeting #79, May 10-14, 2010, Kyoto, Japan, TD S2-102569,"Enabling UPnP/DLNA multicast traffic with LIPA Solution 1", Motorola, 5 pgs.

(Continued)

*Primary Examiner* — Atique Ahmed
(74) *Attorney, Agent, or Firm* — Harrington & Smith

(57) ABSTRACT

A method for providing a bearer service in a communications system is disclosed. The method includes establishing a radio bearer service between a network apparatus and a user terminal, for transmitting messages over an air interface, such that a point-to-point radio bearer is to be used for transmitting unicast messages and its associated shared point-to-multipoint broadcast radio bearer in downlink is to be used for transmitting one or more of broadcast and multicast messages from a local IP network via the network apparatus to user terminals. Messages received from the point-to-point radio bearer and its associated point-to-multipoint broadcast radio bearer in downlink are combinable in the user terminal to a single connection emulating one or more of a broadcast and multicast capable media respectively over the air interface.

16 Claims, 6 Drawing Sheets

(56) References Cited

U.S. PATENT DOCUMENTS

| | | | | |
|---|---|---|---|---|
| 2010/0008234 A1* | 1/2010 | Ulupinar | ............... | H04W 68/00 370/241 |
| 2010/0165901 A1* | 7/2010 | Kim | .................... | H04W 72/005 370/312 |
| 2010/0195622 A1* | 8/2010 | Buchmayer | ....... | H04W 36/0007 370/332 |
| 2011/0235563 A1* | 9/2011 | Tinnakornsrisuphap | .................... | H04W 76/15 370/312 |
| 2011/0243053 A1* | 10/2011 | Tinnakornsrisuphap | .................... | H04L 12/189 370/312 |
| 2011/0319129 A1* | 12/2011 | Bhat | ..................... | H04W 72/02 455/552.1 |
| 2012/0076121 A1* | 3/2012 | Choi | .................... | H04W 36/08 370/338 |
| 2012/0188878 A1* | 7/2012 | Simon | .................... | H04W 4/06 370/241 |
| 2013/0021204 A1* | 1/2013 | Walker | ................. | H04W 16/28 342/372 |
| 2013/0044668 A1* | 2/2013 | Purnadi | ............ | H04W 36/0055 370/312 |
| 2013/0058338 A1* | 3/2013 | Guttman | ............ | H04L 12/1836 370/390 |

OTHER PUBLICATIONS

3GPP TSG SA WG2 Meeting #83, Feb. 21-25, 2011, Salt Lake City, UT, USA, TD S2-110374, "LIPA Multicast Support and MBMS Service", Samsung, 3 pgs.

* cited by examiner

BEARER SERVICE IN COMMUNICATIONS

FIELD OF THE INVENTION

The exemplary and non-limiting embodiments of this invention relate generally wireless communications networks, and more particularly to providing a bearer service.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

LIPA (local IP access) enables a UMTS or LTE device to access a local IP network that a femtocell is connected to. When a user has a femtocell at home or in the office, mobile devices may use LIPA to access devices that are connected to the local network over the femtocell. To get access to devices on a local network to which a femtocell is connected to, the mobile device uses a special APN. APN tells SGSN (UMTS) or MME (LTE) that the mobile device wants to get a connection to the local network and not to the network operator's core network. Optionally, a LIPA flag is defined that is sent by the mobile device during PDP context establishment (UMTS) or default bearer activation (LTE) for the same purpose. For simultaneous access to the local network and the internet, the mobile may have two PDP contexts (UMTS) or two default bearers (LTE): one that terminates in the local network and one that goes through the core network to GGSN/P-GW. In case internet connectivity is available through the local network, LIPA allows UE to reach the internet this way. Once the LIPA PDP context/default bearer is established, data flows directly to L-GW and from there into the local network without traversing the radio access network or the core network of the network operator. Control of the LIPA PDP context/default bearer may remain with SGSN/MME in the core network. In other words, authentication, authorization and security procedures remain with the network operator. Incoming packets from the local network are forwarded to a mobile device that is in an UMTS idle/cell or URA_PCH state or LTE idle state respectively. In these states, the mobile device is paged first and has to re-establish an RRC (radio resource control) connection before the data can be forwarded.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, a computer program product, and a computer-readable storage medium as defined in the independent claims. Further embodiments of the invention are disclosed in the dependent claims.

An aspect of the invention relates to a method for providing a bearer service in a communications system, the method comprising establishing, a radio bearer service between a network apparatus and a user terminal, for transmitting messages over an air interface, wherein a point-to-point radio bearer is to be used for transmitting unicast messages and its associated shared point-to-multipoint broadcast radio bearer in downlink is to be used for transmitting one or more of broadcast and multicast messages from a local IP network via the network apparatus to user terminals, such that messages received from a point-to-point radio bearer and its associated point-to-multipoint broadcast radio bearer in downlink are combinable in the user terminal to a single connection emulating one or more of a broadcast and multicast capable media respectively over the air interface.

A further aspect of the invention relates to an apparatus comprising a communication control circuitry configured to establish a radio bearer service between the apparatus and a user terminal, for transmitting messages over an air interface, wherein a point-to-point radio bearer is to be used for transmitting unicast messages and its associated shared point-to-multipoint broadcast radio bearer in downlink is to be used for transmitting one or more of broadcast and multicast messages from a local IP network via the apparatus to user terminals, such that messages received from a point-to-point radio bearer and its associated point-to-multipoint broadcast radio bearer in downlink are combinable in the user terminal to a single connection emulating one or more of a broadcast and multicast capable media respectively over the air interface.

A still further aspect of the invention relates to an apparatus comprising at least one processor, and at least one memory including a computer program code, wherein the at least one memory and the computer program code are configured to, with the at least one processor, cause the apparatus to establish a radio bearer service between the apparatus and a user terminal, for transmitting messages over an air interface, wherein a point-to-point radio bearer is to be used for transmitting unicast messages and its associated shared point-to-multipoint broadcast radio bearer in downlink is to be used for transmitting one or more of broadcast and multicast messages from a local IP network via the apparatus to user terminals, such that messages received from a point-to-point radio bearer and its associated point-to-multipoint broadcast radio bearer in downlink are combinable in the user terminal to a single connection emulating one or more of a broadcast and multicast capable media respectively over the air interface.

A still further aspect of the invention relates to a user equipment comprising a communication control circuitry configured to receive messages transmitted over an air interface, wherein a point-to-point radio bearer is used for transmitting unicast messages and its associated shared point-to-multipoint broadcast radio bearer in downlink is used for transmitting one or more of broadcast and multicast messages from a local IP network via a network apparatus to the user terminal, and combine the messages received from the point-to-point radio bearer and its associated point-to-multipoint broadcast radio bearer in downlink, to a single connection emulating one or more of a broadcast and multicast capable media respectively over the air interface.

A still further aspect of the invention relates to a computer program comprising program code means adapted to perform any one of the method steps according to an embodiment of the invention when the program is run on a computer.

A still further aspect of the invention relates to a computer readable storage medium comprising computer readable code for executing a computer process according to an embodiment of the invention.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
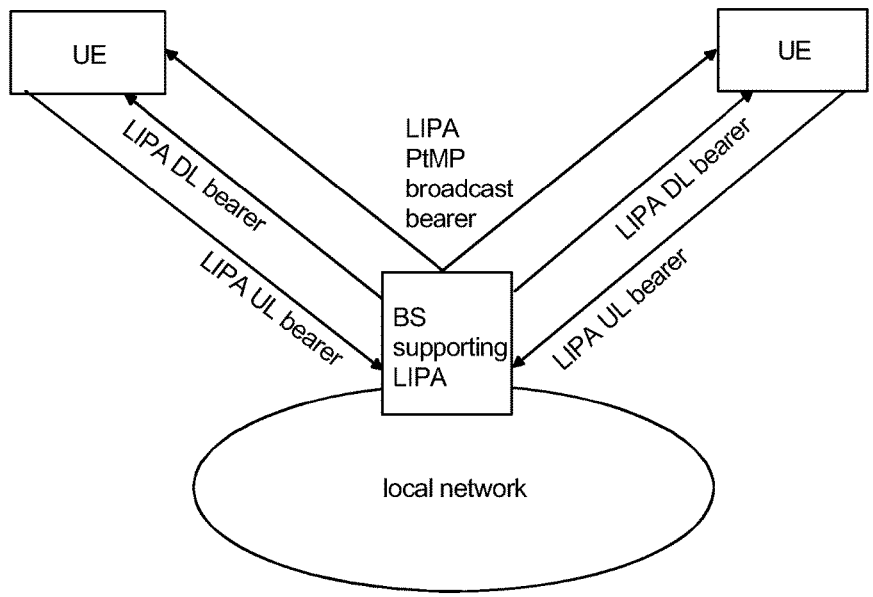
FIG. 1 illustrates LIPA bearers according to an exemplary embodiment.

An exemplary embodiment relates to future networks enabling and supporting a local breakout functionality (local IP access, LIPA), such as LTE etc. An exemplary embodiment may involve eNBs, UEs and/or local gateways (L-GW).

An ethernet bearer and shared prefix model may be introduced using point-to-point (PtP) radio bearers. These, however, do not include e.g. a broadcast bearer when needed for DL neighbour discovery (ND) delivery/point-to-multipoint in detail.

The way of utilizing radio broadcast to realize IP multicast/broadcast according to an exemplary embodiment may have some resemblance to e.g. MBMS (multimedia broadcast multicast service) procedures as well as multicasting/broadcasting ND messages and/or protocol messages using MBMS like radio broadcast channel. In an exemplary embodiment, the multicast/broadcast channel which is used only for the protocol messages that needs multicasting, may be combined with a regular user specific unicast user plane channel in UE, so that UE's IP stack sees them as one logical IP interface. UE (IP host generally) seems not to be able to handle a situation where ND messages and other IP traffic are received from different interfaces. E.g. in a fixed network there may be no problem with IP host connected, as it seems that the messages including ND messages use the same interface without any confusion. A problem with the mobile terminals seems to come from how they handle bearers. Without the combining function the terminal just may not associate the broadcast/multicast bearer which pushes ND messages towards it, to a regular user plane bearer heading to the corresponding network. UE IP stack is supposed to understand that these two logical connections belong to the same IPv6 link.

An exemplary embodiment involves creating a new local IP access (LIPA) broadcast radio bearer service to carry multicast IP messages efficiently over radio interface (i.e. basically to emulate a kind of ethernet-type broadcasting e.g. for handling IPv6 link-local multicast messaging for UEs sharing the same LIPA base station). In other words, a way how the multicast packets are transported between a local network and UE attached to the local network. It enables neighbour discovery to function, and therefore enables typical home network address assignment procedures to work also on a LIPA bearer. An exemplary embodiment involves combining a multicast/broadcast channel which is used only for the protocol messages that need multicasting, with the regular user specific unicast user plane channel in UE, so that UE's IP stack sees them as one logical IP interface.

An exemplary embodiment helps to provide kind of WLAN type access network services over a femto cell. If there is a large number of LIPA UEs served by one eNB, radio resources may be saved by using broadcast bearer to send multicast messages only once instead of repeating them on dedicated bearers (point-to-multipoint vs. point-to-point).

A 3GPP bearer model implicitly defines the used IP link model. 3GPP accesses have two models:

an "old" point-to-point link model used since GPRS; the link is between UE and PGW/GGSN, a "new" point-to-point link model used with PMIPv6; the link is between UE and SGW but the IPv6 prefix/IPv4 address is still topologically anchored to the PGW.

Since GPRS-times, 3GPP compliant host OSs have abstracted the PDP connection as a dial-up "PPP-like" interface.

Modern host OSs may wish to abstract "everything" as an IEEE 802 (ethernet) type interface. This may lead to false assumptions on both end-host and network side regarding link model and addressing. As a result there may be no working combinations regarding addressing, and a need for a bearer model with true ethernet addressing is recognised.

A neighbour discovery (ND) protocol for IPv6 is a fundamental network layer protocol for IPv6, by which IPv6 hosts uses for, address configuration, L2 address resolution (AR) of other nodes, duplicate address detection (DUD), router discovery etc. The ND protocol is used inside an IPv6 link (subnet), and assumes the multicast capable transport. Some ND messages may be sent (multicast) to specific multicast groups, part of them to an All_Nodes multicast group, which means in practice broadcasting to each host in the link.

The 3GPP IPv6 link model is based on dedicated prefixes per UE. Exactly one dedicated prefix is assigned for each UE, which means that there are no other hosts in a same IPv6 link (subnet). The prefix is advertised to UE as a prefix that cannot be used for on-link determination ("non-on-link prefix") so that UE knows that it is the only host in the link and sends each packet to a default router (P-GW, GGSN). Since UE is the only host in the link, most of the ND procedures may be omitted and no ND multicasting is needed.

With introduction of LIPA (local IP access) 3GPP UEs (and BSs) may be connected to a third-party-administered local area network. If the local mobile GW (L-GW) is a layer-2 device like in the case of an ethernet bearer, UEs logically belong to the network of the access router(s) of the local network.

The address configuration management of the third party network is beyond the control of a mobile operator, thus for the flexibility sake the 3GPP subsystem should adapt to the usual IP addressing and link models used in the wired LANs. The shared IPv6 prefix link model is commonly used in LAN interfaces, meaning that each host including mobile ones share the same IPv6 prefix and belong to the same IPv6 link, which in turn necessitates that ND protocol messages are to be transported between hosts and routers.

The ND protocol assumes a multicast-capable link. The 3GPP access link based on default and dedicated bearers is not, as such, multicast capable; instead the 3GPP access link is formed of point-to-point links (bearers) either between UE and P-GW/GGSN (3GPP variant) or UE and S-GW (IETF variant). The multicast link may be emulated by replicating multicast packets to point-to-point links (bearers) and sending replicated packets individually to each bearer, but this increases overhead and wastes radio resources and transport resources and should thus be avoided.

The current 3GPP IPv6 link model relies on dedicated IPv6 prefixes for UE, which means that only PDN GW belongs to the same IPV6 link together with UE, which makes on-link determination unnecessary, thus avoiding ND protocol multicast. However, by means of the LIPA feature, 3GPP UE may be attached to a third party administrator's network whose IP addressing policies are beyond a mobile network operator's control and quite often (probably) use shared IPv6 prefixes.

An exemplary embodiment proposes that a point-to-multipoint broadcast bearer service is used for transporting ND messages (or other messages) with a multicast destination address over the air interface (see FIG. 1 illustrating LIPA bearers with two UEs using a LIPA connection to a local network). In an exemplary embodiment, when initiating a direct access to the local network (LIPA service), i.e. when a two-way (uplink and downlink) LIPA dedicated bearer is established, UE starts reception of the downlink LIPA broadcast bearer service which is dedicated for the ND protocol message multicasting.

Figure 2:
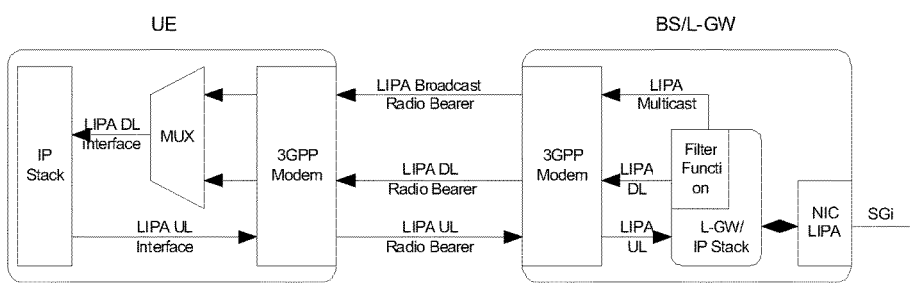
FIG. 2 illustrates LIPA data flows according to an exemplary embodiment.

In an exemplary embodiment, the LIPA broadcast bearer service is established for a LIPA base station for transporting ND protocol messages, or some other protocol messages requiring multicasting, towards UEs. A filter function in the BS internal local GW identifies, based on a criteria such as a protocol (e.g. ARP, ICMP or some other protocol), and/or a destination address, etc., messages that are to be multicast and forwards them to the LIPA broadcast bearer (see FIG. 2 illustrating LIPA data flows with a LIPA connection to a local network using on-link prefixes). Other user plane traffic to UE from the local network interface (see SGi in FIG. 2) or from another UE is forwarded to a regular unicast LIPA downlink bearer. BS keeps track on the LIPA UEs attached to BS, and in the case that there is none, BS may stop transmitting on the LIPA broadcast channel in order to save radio resources. BS may also, if beneficial, for example, in radio resource-wise, decide to use the regular LIPA downlink bearer for ND protocol message delivery. The filter function in L-GW may also comprise multicast listener discovery (MLD) snooping for IPv6 or IGMP snooping for IPv4 functionality. Multicast snooping makes it possible to filter off multicast messages targeted to multicast groups to which none of the camped UEs are belonging.

In an exemplary embodiment, when the LIPA bearer is established, UE receives a configuration message for configuring a LIPA bearer service and its associated LIPA broadcast bearer service, giving the necessary information for UE to start the reception of the LIPA broadcast service. Based on this configuration message, the downlink flows from the unicast LIPA downlink bearer and the LIPA multicast bearer are combined together in a multiplexer function of UE so that UE's IP stack sees them as a single logical ingress interface (see a MUX function in FIG. 2).

The LIPA broadcast bearer is common for the LIPA UEs connected to a local IP network and carries data that does not interest every UE. It is up to the UE's IP stack to recognise multicast packets that concern it.

In an exemplary embodiment, the ND protocol messages from UE to another host in LAN are sent to the uplink LIPA unicast bearer as other user plane uplink traffic.

In an exemplary embodiment, L-GW may either be a standalone node, or a collocated function in BS. In the case of standalone L-GW, the LIPA multicast traffic may be delivered from L-GW to LIPA base stations by using IP multicasting and transmitted over the air interface by using a coordinated transmission scheme similar to that of a multi-cell MBMS.

Thus, the enhanced bearer model for local IP access according to an exemplary embodiment involves delivering multicast (ND) protocol messages from a local IP network to UEs by using a point-to-multipoint (broadcast) radio bearer service which is combined to a regular bearer in UE so that UE sees them as one logical downlink interface. With LIPA, the delivery of ND messaging becomes topical if L2-modelled local GWs are used or an ethernet like link model is used in a local GW. Many ND messages are sent to multicast IP addresses. Multicasting over the point-to-point 3GPP radio bearers introduces overhead and is waste of radio capacity.

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network element, server, corresponding component, and/or to any communication system or any combination of different communication systems that support a bearer service. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, without restricting the embodiment to such an architecture, however.

Figure 3:
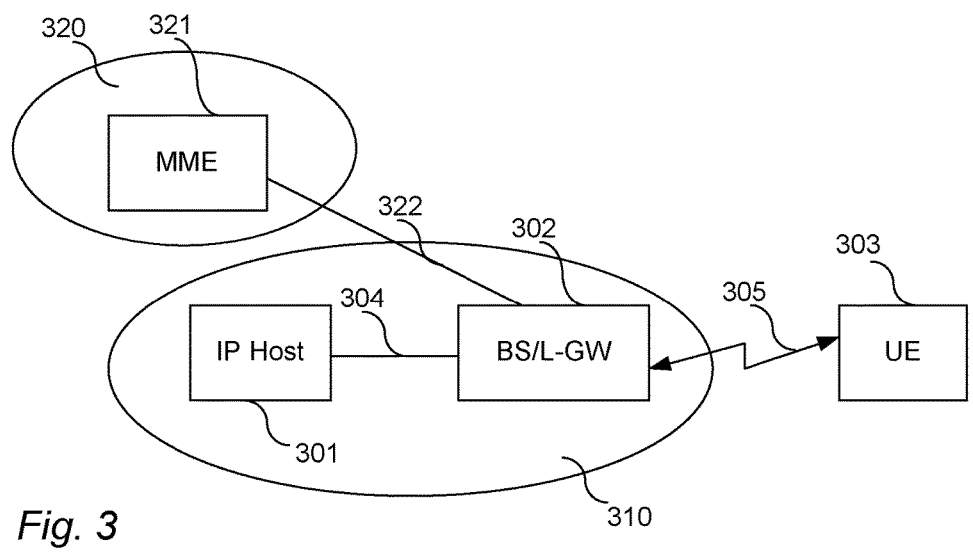
FIG. 3 shows a simplified block diagram illustrating exemplary system architecture.

With reference to FIG. 3, let us examine an example of a radio system to which embodiments of the invention can be applied. In this example, the radio system is based on LTE network elements. However, the invention described in these examples is not limited to the LTE radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

A general architecture of a communication system is illustrated in FIG. 3. FIG. 3 is a simplified system architecture only showing some elements and functional entities, all being logical units whose implementation may differ from what is shown. The connections shown in FIG. 3 are logical connections; the actual physical connections may be different. It is apparent to a person skilled in the art that the systems also comprise other functions and structures. It should be appreciated that the functions, structures, elements, and protocols used in or for fixed or wireless communication are irrelevant to the actual invention. Therefore, they need not be discussed in more detail here.

The exemplary radio system of FIG. 3 comprises a local network node 301, e.g. an IP host connected to a local network 310. The network node 301 may include e.g. an application server, PC, and/or a printer. The local network node 301 may be operationally connected (directly or indirectly) to a radio network node 302 including a local gateway function, via a connection 304. The local network node 301 and the radio network node 302 are operationally connected (directly or indirectly) to the same local IP network 310. The radio network node may include e.g. a base station (BS, node-B, eNB), access point (AP), radio network controller (RNC), or any other network element or a combination of network elements. In FIG. 3, the radio network node 302 that may also be called a base station (BS) and/or eNB/RNC (enhanced node-B/radio network controller) of the radio system hosts the functions for radio resource management in a public land mobile network. The radio network node 302 may also be connected to a core network 320 and one or more core network elements such as a mobility management entity MME 321, via a connection 322. FIG. 3 shows one or more user equipment 303 located in the service area of the radio network node 302. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smartphone, personal digital assistant (PDA), handset, laptop computer. In the example situation of FIG. 3, the user equipment 303 is capable of connecting to the radio network node 302 via a connection 305.

FIG. 3 only illustrates a simplified example. In practice, the network may include more network elements and user terminals. The networks of two or more operators may overlap, the sizes and form of the cells may vary from what is depicted in FIG. 3, etc. The communication system may also be able to communicate with other networks, such as a public switched telephone network. The embodiments are not, however, restricted to the network given above as an example, but a person skilled in the art may apply the solution to other communication networks provided with the necessary properties. For example, the connections between different network elements may be realized with internet protocol (IP) connections.

Figure 4:
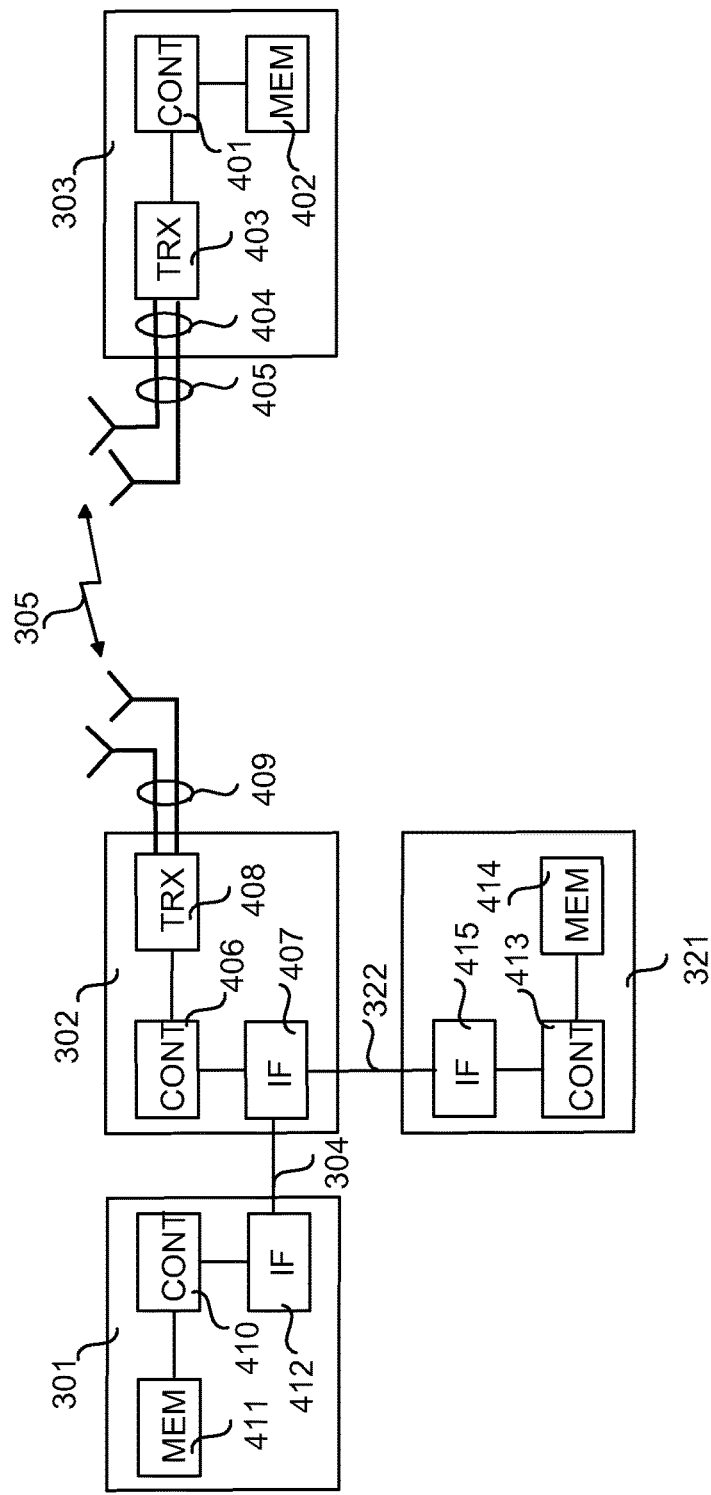
FIG. 4 shows a simplified block diagram illustrating exemplary apparatuses.

FIG. 4 illustrates examples of apparatuses according to embodiments of the invention. FIG. 4 shows a user equipment 303 located in the area of the radio network node 302. The user equipment is configured to be in connection with the radio network node 302. The user equipment or UE 303 comprises a controller 401 operationally connected to a memory 202 and a transceiver 403. The controller 401 controls the operation of the user equipment 303. The memory 402 is configured to store software and data. The transceiver 403 is configured to set up and maintain a wireless connection to the radio network node 302. The transceiver is operationally connected to a set of antenna ports 404 connected to an antenna arrangement 405. The antenna arrangement 405 may comprise a set of antennas. The number of antennas may be one to four, for example. The number of antennas is not limited to any particular number. The user equipment 303 may also comprise various other components, such as a user interface, camera, and media player. They are not displayed in the figure due to simplicity. The radio network node 302 comprises a controller 406 operationally connected to an interface 407, and a transceiver 408. The controller 406 controls the operation of the radio network node 302. The transceiver 408 is configured to set up and maintain a wireless connection to the user equipment 303 within the service area of the radio network node 302. The transceiver 408 is operationally connected to an antenna arrangement 409. The antenna arrangement 409 may comprise a set of antennas. The number of antennas may be two to four, for example. The number of antennas is not limited to any particular number. The radio network node may be operationally connected (directly or indirectly) to another network element 301 of the communication system, such as an IP host, e.g. an application server, PC and/or a printer. The network element 301 may comprise a controller 410 operationally connected to an interface 412, and a memory 411. The controller 410 controls the operation of the network node 301. The memory 411 is configured to store software and data. The radio network node may also be operationally connected (directly or indirectly) to a further network element 321 of the communication system, such as a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a base station controller (BSC), a gateway, and/or a server. The network element 321 may comprise a controller 413 operationally connected to an interface 415, and a memory 414. The controller 413 controls the operation of the network node 321. The memory 414 is configured to store software and data. The embodiments are not, however, restricted to the network given above as an example, but a person skilled in the art may apply the solution to other communication networks provided with the necessary properties. For example, the connections between different network elements may be realized with internet protocol (IP) connections.

The memory may include volatile and/or non-volatile memory and typically stores content, data, or the like. For example, the memory may store computer program code such as software applications (for example for the detector unit and/or for the adjuster unit) or operating systems, information, data, content, or the like for the processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

User equipment may refer to any user communication device. A term "user equipment" as used herein may refer to any device having a communication capability, such as a wireless mobile terminal, a PDA, tablet, a smart phone, a personal computer (PC), a laptop computer, a desktop computer, etc. For example, the wireless communication terminal may be an UMTS or GSM/EDGE smart mobile terminal having wireless modem. Thus, the application capabilities of the device according to various embodiments of the invention may include native applications available in the terminal, or subsequently installed applications by the user or operator or other entity. The network apparatus 302 may be implemented in any network element, such as a server.

FIG. 4 is a block diagram of an apparatus according to an embodiment of the invention. Although the apparatus has been depicted as one entity, different modules and memory may be implemented in one or more physical or logical entities.

The functionality of the network apparatus 302 is described in more detail below with FIGS. 5 and 6. It should be appreciated that the apparatus 302 may comprise other units used in or for distributed computing and/or data federation. However, they are irrelevant to the actual invention and, therefore, they need not to be discussed in more detail here.

The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a personal computer, a game console, a laptop (a notebook), a personal digital assistant, a mobile station (mobile phone), and a line telephone.

The apparatus 301, 302, 303, 321 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it may be communicatively coupled to the processor/computer via various means as is known in the art.

Figure 5:
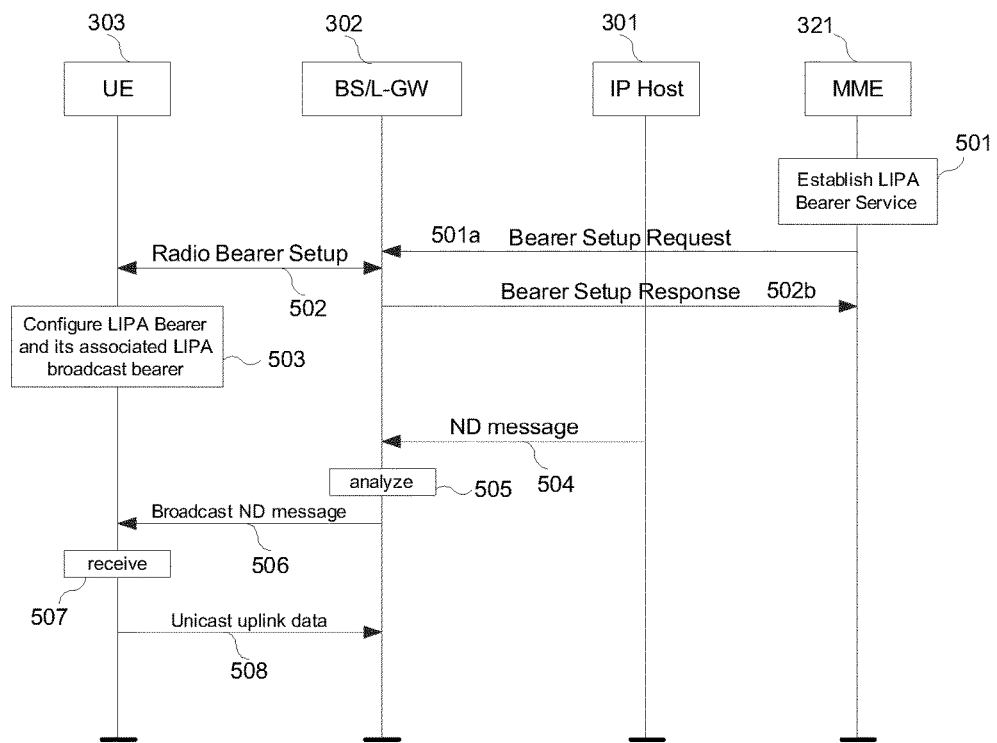
FIG. 5 shows a messaging diagram illustrating signalling according to an exemplary embodiment.

The signalling chart of FIG. 5 illustrates the required signalling. In the example of FIG. 5, a network element 321 which may comprise e.g. a core network node such as a mobility management entity 321, decides, in item 501, to establish a LIPA bearer service via a network apparatus such as a base station BS and/or a local gateway L-GW 302, by sending a bearer setup request message 501a to the apparatus 302, wherein the apparatus 302 performs a radio bearer setup procedure 502 for configuring a LIPA bearer service and its associated LIPA broadcast bearer service for transmitting messages over the air interface 305, such that a point-to-multipoint broadcast bearer service may be used for transmitting neighbour discovery ND messages (or other messages) with a multicast destination address from the apparatus 302 to user terminals 303. Thus the radio bearer setup procedure 502 concerns both the LIPA bearer (unicast) and the established LIPA broadcast bearer (multicast) service, informing the user terminal 303 that the user terminal 303 may start reception of the LIPA broadcast bearer service. In response to the radio bearer setup procedure 502, a bearer setup response message 502b may be transmitted from the apparatus 302 to the network element 321. In item 503, the user terminal 303 configures the radio bearers according to the parameters received in the radio bearer setup procedure 502 from the apparatus 302. A network node 301 such as an IP host, may transmit an ND message 504 or another message 504 that is to be multicast to the user terminals 303. In response to receiving the message 504 in the apparatus 302, the apparatus 302 analyses, in item 505, whether the message 504 is to be multicast, wherein if the apparatus 302 identifies that the message is to be multicast, the apparatus 302 forwards 506 the identified message via the established LIPA broadcast bearer service to the user terminals 303 connected to the apparatus 302. In item 507, the user terminal 303 receives the multicast message 506 via the established LIPA broadcast bearer service. In a message 508, the user terminal 303 may send ND protocol messages to another host in the local IP network 310 via an uplink LIPA unicast bearer service.

Figure 6:
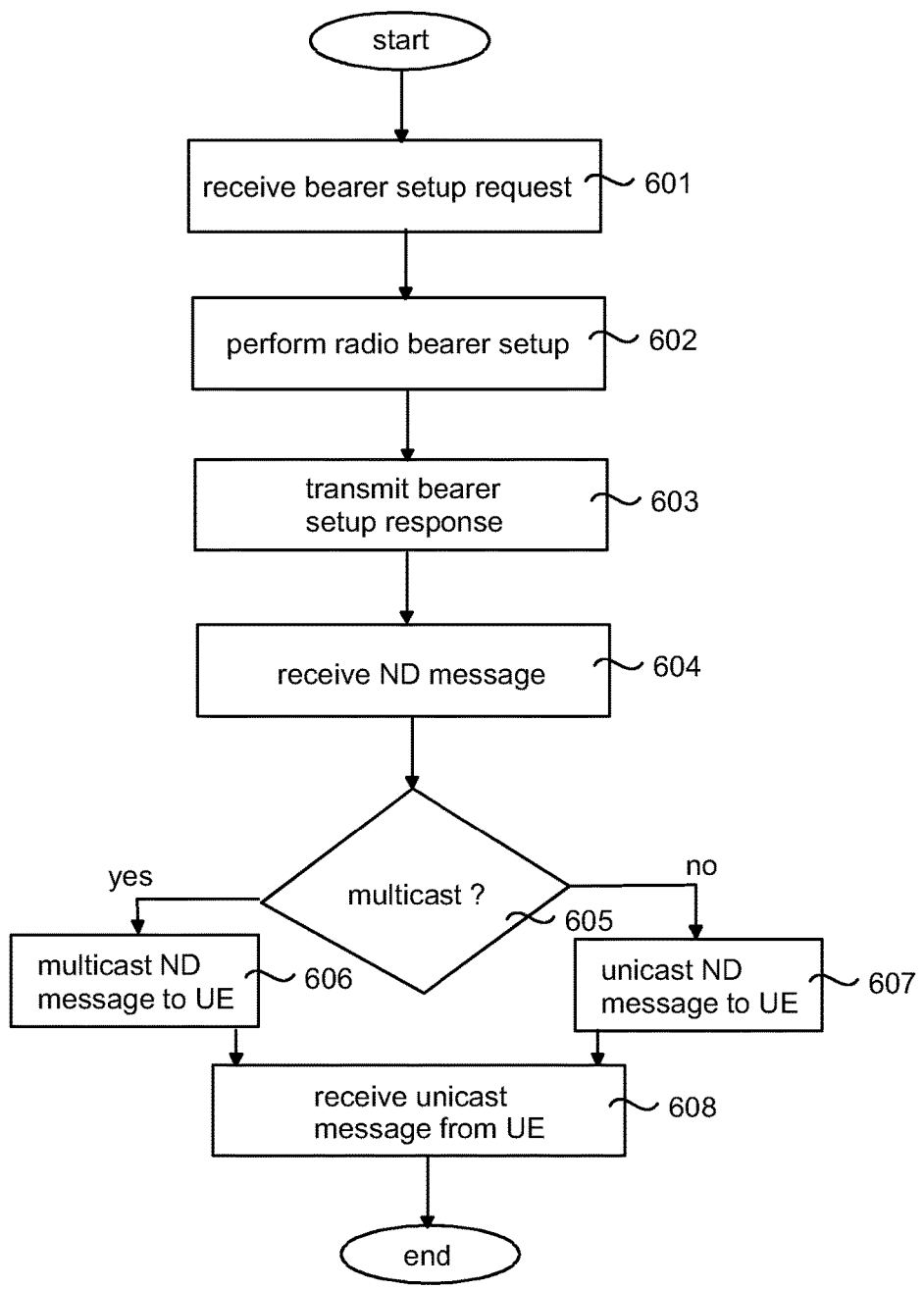
FIG. 6 shows a schematic diagram of a flow chart according to an exemplary embodiment.

FIG. 6 is a flow chart illustrating an exemplary embodiment. The network apparatus 302 which may comprise e.g. a network element (network node) such as a base station BS and/or a local gateway L-GW, receives, in item 601, a bearer setup request message from a core network element 321, regarding establishment of a LIPA bearer service. In item 602, the apparatus 302 performs a radio bearer setup procedure for configuring a LIPA bearer service and its associated LIPA broadcast bearer service for transmitting messages over the air interface 305, such that a point-tomultipoint broadcast bearer service may be used for transmitting neighbour discovery ND messages (or other messages) with a multicast destination address from the apparatus 302 to user terminals 303. In response to the bearer setup procedure, a bearer setup response message may be transmitted, in item 603, from the apparatus 302 to the network element 321. The bearer setup procedure 602 concerns both the LIPA bearer (unicast) and the established LIPA broadcast bearer (multicast) service, informing the user terminal(s) 303 that the user terminal(s) 303 may start reception of the LIPA broadcast bearer service. A network element 301 such as an IP host, may transmit an ND message (or another message) that is to be multicast to the user terminals 303. In response to receiving, in item 604, the ND message (or other message) that is to be multicast, the apparatus 302 is configured to analyse, in item 605, whether the ND message (or other message) is to be multicast, wherein if the apparatus 302 identifies 605 that the message is to be multicast, the apparatus 302 is configured to forward 606 the identified message via the established LIPA broadcast bearer service to the user terminals 303 connected to the apparatus 302. However, if it is discovered that the message is not to be multicast or if, for example, it is beneficial in terms of the radio resource usage, a downlink LIPA unicast bearer service may be used 607 for transmission of the ND message or other message to the user terminal. In item 608, the apparatus may receive (and forward) ND protocol messages transmitted from the user terminal 303 via an uplink LIPA unicast bearer service, the messages being directed to another host in the local IP network.

Figure 7:
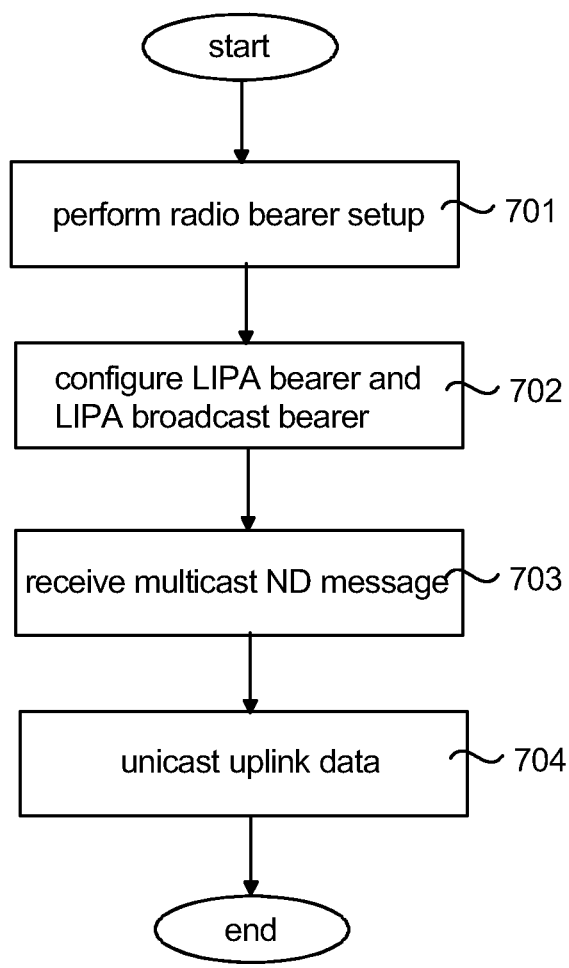
FIG. 7 shows a schematic diagram of a flow chart according to an exemplary embodiment.

FIG. 7 is a flow chart illustrating an exemplary embodiment. The user equipment 303 which may comprise e.g. a user terminal such as a mobile station or a laptop, performs, in item 701, with a network apparatus 302, a radio bearer setup procedure regarding a LIPA bearer (unicast) service and a LIPA broadcast bearer (multicast) service. In item 702, the user terminal 303 configures the radio bearers according to the parameters received from the apparatus 302 in the radio bearer setup procedure, wherein the user terminal 303 may start reception of the LIPA broadcast bearer service. In item 703, the user equipment 303 may receive, from the network apparatus 302, a multicast message (e.g. an ND message) via the established LIPA broadcast bearer service. In item 704, the user equipment 303 may send (e.g. via the network apparatus 302) unicast data (e.g. a neighbour discovery protocol message) to another host in a local IP network via an uplink LIPA unicast bearer service.

Thus, according to an exemplary embodiment, there is provided a method for providing a bearer service in a communications system, the method comprising establishing, a radio bearer service between a network apparatus and a user terminal, for transmitting messages over an air interface, wherein a point-to-point radio bearer is to be used for transmitting unicast messages and its associated shared point-to-multipoint broadcast radio bearer in downlink is to be used for transmitting one or more of broadcast and multicast messages from a local IP network via the network apparatus to user terminals, such that messages received from a point-to-point radio bearer and its associated point-to-multipoint broadcast radio bearer in downlink are combinable in the user terminal to a single connection emulating one or more of a broadcast and multicast capable media respectively over the air interface.

According to another exemplary embodiment, there is provided a method for establishing a LIPA broadcast bearer service for transmitting neighbour discovery messages or other protocol messages requiring multicasting, to user terminals.

According to yet another exemplary embodiment, there is provided a method for identifying a message that is to be multicast; and forwarding the identified message by utilizing the established broadcast bearer service to user terminals connected to the network apparatus.

According to yet another exemplary embodiment, there is provided a method for identifying a message that is to be multicast, based on one or more of a communications protocol and a destination address, and forwarding user plane data traffic that is not to be multicast, from a local network interface or from a further user terminal, via a downlink unicast bearer service to the user terminal.

According to yet another exemplary embodiment, said communications protocol comprises one or more of ARP and ICMP.

According to yet another exemplary embodiment, there is provided a method for keeping track on LIPA user terminals attached to the network apparatus, wherein if there are no LIPA user terminals attached to the network apparatus, the method comprises stopping transmission via a LIPA broadcast bearer service.

According to yet another exemplary embodiment, there is provided a method for stopping transmission via a LIPA broadcast bearer service, if beneficial in terms of the radio resource usage, wherein a downlink LIPA unicast bearer service is to be used for transmission of the neighbour discovery messages.

According to yet another exemplary embodiment, the network apparatus comprises a standalone local gateway, wherein LIPA multicast data traffic is delivered from an MBMS gateway to LIPA base stations by using IP multicasting.

According to yet another exemplary embodiment, the network apparatus comprises a LIPA base station.

According to yet another exemplary embodiment, there is provided an apparatus comprising a communication control circuitry configured to establish a radio bearer service between the apparatus and a user terminal, for transmitting messages over an air interface, wherein a point-to-point radio bearer is to be used for transmitting unicast messages and its associated shared point-to-multipoint broadcast radio bearer in downlink is to be used for transmitting one or more of broadcast and multicast messages from a local IP network via the apparatus to user terminals, such that messages received from a point-to-point radio bearer and its associated point-to-multipoint broadcast radio bearer in downlink are combinable in the user terminal to a single connection emulating one or more of a broadcast and multicast capable media respectively over the air interface.

According to yet another exemplary embodiment, there is provided an apparatus comprising a communication control circuitry configured to establish a LIPA broadcast bearer service for transmitting neighbour discovery messages or other protocol messages requiring multicasting, towards user terminals.

According to yet another exemplary embodiment, there is provided an apparatus comprising a communication control circuitry configured to identify a message that is to be multicast; and forward the identified message by utilizing the established broadcast bearer service to user terminals connected to the apparatus.

According to yet another exemplary embodiment, there is provided an apparatus comprising a communication control circuitry configured to carry out the identifying based on one or more of a communications protocol and a destination address; and forward user plane data traffic that is not to be multicast, from a local network interface or from a further user terminal, via a downlink unicast bearer service to the user terminal.

According to yet another exemplary embodiment, there is provided an apparatus comprising a communication control circuitry configured to keep track on LIPA user terminals attached to the apparatus; and stop transmission via the LIPA broadcast bearer service, if there are no LIPA user terminals attached to the apparatus.

According to yet another exemplary embodiment, there is provided an apparatus comprising a communication control circuitry configured to stop transmission via the LIPA broadcast bearer service, if beneficial in terms of the radio resource usage, wherein a downlink LIPA unicast bearer service is to be used for transmission of the neighbour discovery messages.

According to yet another exemplary embodiment, there is provided an apparatus comprising a filter function for filtering off multicast messages targeted to multicast groups to which none of the user terminals connected to the apparatus are belonging, the filter function including one or more of a multicast listener discovery MLD snooping for an IPv6 functionality and an IGMP snooping for an IPv4 functionality.

According to yet another exemplary embodiment, the apparatus comprises a standalone local gateway, wherein the communication control circuitry is further configured to deliver LIPA multicast data traffic from an MBMS gateway to LIPA base stations by using IP multicasting.

According to yet another exemplary embodiment, there is provided an apparatus comprising at least one processor; and at least one memory including a computer program code, wherein the at least one memory and the computer program code are configured to, with the at least one processor, cause the apparatus to establish a radio bearer service between the apparatus and a user terminal, for transmitting messages over an air interface, wherein a point-to-point radio bearer is to be used for transmitting unicast messages and its associated shared point-to-multipoint broadcast radio bearer in downlink is to be used for transmitting one or more of broadcast and multicast messages from a local IP network via the apparatus to user terminals, such that messages received from a point-to-point radio bearer and its associated point-to-multipoint broadcast radio bearer in downlink are combinable in the user terminal to a single connection emulating one or more of a broadcast and multicast capable media respectively over the air interface.

According to yet another exemplary embodiment, there is provided a user equipment comprising a communication control circuitry configured to receive messages transmitted over an air interface, wherein a point-to-point radio bearer is used for transmitting unicast messages and its associated shared point-to-multipoint broadcast radio bearer in downlink is used for transmitting one or more of broadcast and multicast messages from a local IP network via a network apparatus to the user terminal; and combine the messages received from the point-to-point radio bearer and its associated point-to-multipoint broadcast radio bearer in downlink, to a single connection emulating one or more of a broadcast and multicast capable media respectively over the air interface.

According to yet another exemplary embodiment, there is provided a user equipment comprising a communication control circuitry configured to combine, by means of a multiplexer functionality, downlink data traffic transmitted via a downlink LIPA unicast bearer service and downlink data traffic transmitted via the LIPA broadcast bearer service, so that an IP stack of the user equipment sees the downlink LIPA unicast bearer service and the LIPA broadcast bearer service as one logical ingress interface.

According to yet another exemplary embodiment, there is provided a user equipment comprising a communication control circuitry configured to send neighbour discovery protocol messages to another host in a local area network via an uplink LIPA unicast bearer service.

According to yet another exemplary embodiment, the LIPA broadcast bearer service is common for LIPA-capable user terminals, wherein the user equipment comprises a communication control circuitry configured to recognise multicast packets that concern the user equipment.

According to yet another exemplary embodiment, there is provided a computer program comprising program code means adapted to perform any one of the method steps when the program is run on a computer.

According to yet another exemplary embodiment, there is provided a computer readable storage medium comprising computer readable code for executing a computer process according to any one of the method steps.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP bearer dedicated point-to-point connection for UE
AR address resolution
ARP address resolution protocol
eNB evolved node-B
DUD duplicate address detection
EPS evolved packet system
GGSN gateway GPRS support node
GPRS general packet radio service
HeNB home eNB
ICMP internet control message protocol
IPv6 internet protocol version 6
ISP internet service provider
L1 layer-1 (physical layer)
Link interface at link layer (layer-2)
L-GW local gateway
LIPA local IP access
MAPCON multi access PDN connectivity
MBMS multimedia broadcast multicast service
ND neighbour discovery
NIC network interface connection at physical layer
OPIIS operator policies for IP interface selection
OS operating system
PDN packet data network
PMIPv6 proxy mobile IPv6
PPP point-to-point protocol
PtP point-to-point
UE user equipment
UL uplink
DL downlink
IP internet protocol
LTE long term evolution
UMTS universal mobile telecommunications system
APN access point name
SGSN serving GPRS support node
MME mobility management entity
PDP packet data protocol P-GW paging gateway
RRC radio resource control
MUX multiplexer
PC personal computer

The invention claimed is:

1. A method comprising
establishing a radio bearer service for transmitting messages over an air interface in a communications system between a network apparatus and a user terminal,
  wherein a point-to-point radio bearer is to be used for transmitting unicast messages on a user plane,
  wherein an associated shared point-to-multipoint broadcast radio bearer in downlink is to be used for transmitting one or more of broadcast and multicast messages for use for protocol messages from a local internet protocol IP network via the network apparatus to user terminals,
  wherein messages received from the point-to-point radio bearer and the associated shared point-to-multipoint broadcast radio bearer in downlink are combinable in the user terminal into a single connection emulating one or more of a broadcast and multicast capable media respectively over the air interface; and
establishing a local Internet protocol access (LIPA) broadcast bearer service for transmitting neighbor discovery messages or other protocol messages requiring multicasting to user terminals and transmitting the messages by utilizing the established broadcast bearer service to user terminals connected to the network apparatus.

2. The method of claim 1, further comprising:
identifying a message that is to be multicast; and
forwarding the identified message by utilizing the established broadcast bearer service to user terminals connected to the network apparatus.

3. The method of claim 2, wherein the identifying is carried based on one or more of a communications protocol and a destination address, wherein the method comprises forwarding user plane data traffic that is not to be multicast, from a local network interface or from a further user terminal, via a downlink unicast bearer service to the user terminal.

4. The method of claim 1, further comprising:
keeping track of LIPA user terminals attached to the network apparatus, wherein if there are no LIPA user terminals attached to the network apparatus, then the method comprises stopping transmission via a LIPA broadcast bearer service.

5. The method of claim 1, further comprising:
stopping transmission via a LIPA broadcast bearer service if beneficial in terms of the radio resource usage, wherein a downlink LIPA unicast bearer service is to be used for transmission of the neighbor discovery messages.

6. The method of claim 1, wherein the network apparatus comprises a standalone local gateway (L-GW), wherein LIPA multicast data traffic is delivered from a multimedia broadcast and multicast service (MBMS) gateway to LIPA base stations by using IP multicasting.

7. An apparatus comprising at least one processor; and at least one memory including a computer program code, wherein the at least one memory and the computer program code are configured to, with the at least one processor, cause the apparatus to at least perform the following:
establishing a radio bearer service for transmitting messages over an air interface in a communications system between the apparatus and a user terminal,
  wherein a point-to-point radio bearer is to be used for transmitting unicast messages on a user plane,
  wherein an associated shared point-to-multipoint broadcast radio bearer in downlink is to be used for transmitting one or more of broadcast and multicast messages for use for protocol messages from a local internet protocol IP network via the network apparatus to user terminals,
  wherein messages received from the point-to-point radio bearer and the associated shared point-to-multipoint broadcast radio bearer in downlink are combinable in the user terminal into a single connection emulating one or more of a broadcast and multicast capable media respectively over the air interface; and
establishing a local Internet protocol access (LIPA) broadcast bearer service for transmitting neighbor discovery messages or other protocol messages requiring multicasting to user terminals and transmitting the messages by utilizing the established broadcast bearer service to user terminals connected to the network apparatus.

8. The apparatus of claim 7, wherein the at least one memory and the computer program code are further configured to, with the at least one processor, cause the apparatus to at least further perform the following:
identifying a message that is to be multicast; and
forwarding the identified message by utilizing the established broadcast bearer service to user terminals connected to the apparatus.

9. The apparatus of claim 8, wherein the at least one memory and the computer program code are further configured to, with the at least one processor, cause the apparatus to at least further perform the following:
identifying based on one or more of a communications protocol and a destination address; and
forwarding user plane data traffic that is not to be multicast, from a local network interface or from a further user terminal, via a downlink unicast bearer service to the user terminal.

10. The apparatus of claim 7, wherein the at least one memory and the computer program code are further configured to, with the at least one processor, cause the apparatus to at least further perform the following:
keeping track of LIPA user terminals attached to the apparatus; and
stopping transmission via the LIPA broadcast bearer service if there are no LIPA user terminals attached to the apparatus.

11. The apparatus of claim 7, wherein the at least one memory and the computer program code are further configured to, with the at least one processor, cause the apparatus to at least further perform the following:
stopping transmission via the LIPA broadcast bearer service if beneficial in terms of the radio resource usage, wherein a downlink LIPA unicast bearer service is to be used for transmission of the neighbor discovery messages.

12. The apparatus of claim 7, wherein the at least one memory and the computer program code are further configured to, with the at least one processor, cause the apparatus to at least further perform the following:
filtering using a filter function off multicast messages targeted to multicast groups to which none of the user terminals connected to the apparatus are belonging, the filter function including one or more of a multicast listener discovery (MLD) snooping for an IPv6 functionality and an IGMP snooping for an IPv4 functionality.

13. The apparatus of claim 7, wherein the at least one memory and the computer program code are further configured to, with the at least one processor, cause the apparatus to at least further perform the following:
   implementing a standalone local gateway (L-GW), and to deliver LIPA multicast data traffic from a multimedia broadcast and multicast service (MBMS) gateway to LIPA base stations by using IP multicasting.

14. A computer program product comprising a non-transitory computer readable storage medium in which a computer program is stored that is configured to provide instructions to perform the method of claim 1 when the program is executed by a computer.

15. A user equipment comprising at least one processor; and at least one memory including a computer program code, wherein the at least one memory and the computer program code are configured to, with the at least one processor, cause the user equipment to at least perform the following:
   receive messages over an air interface, wherein a point-to-point radio bearer is used for receiving unicast messages on a user plane and wherein an associated shared point-to-multipoint broadcast radio bearer in downlink is used for receiving one or more of broadcast and multicast messages for use for protocol messages from a local IP network via a network apparatus to the user terminal;
   combine the messages received from the point-to-point radio bearer and the associated shared point-to-multipoint broadcast radio bearer in downlink into a single connection emulating one or more of a broadcast and multicast capable media respectively over the air interface; and
   send neighbor discovery protocol messages to another host in a local area network via the network apparatus via an uplink local Internet protocol access (LIPA) unicast bearer service.

16. The user equipment of claim 15, wherein the LIPA broadcast bearer service is common for LIPA-capable user terminals, wherein the at least one memory and the computer program code are configured to, with the at least one processor, cause the user equipment to recognize multicast packets that concern the user equipment.

* * * * *